United States Patent
Lee et al.

(10) Patent No.: US 8,817,353 B2
(45) Date of Patent: Aug. 26, 2014

(54) MEMS SHUTTER AND DISPLAY APPARATUS HAVING THE SAME

(75) Inventors: Seul Lee, Seoul (KR); Jae Byung Park, Seoul (KR); Don-Chan Cho, Seongnam-si (KR); Hyun-Min Cho, Seoul (KR); Gunwoo Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 506 days.

(21) Appl. No.: 12/912,593

(22) Filed: Oct. 26, 2010

(65) Prior Publication Data

US 2011/0235147 A1    Sep. 29, 2011

(30) Foreign Application Priority Data

Mar. 26, 2010   (KR) .................. 10-2010-0027452

(51) Int. Cl.
*G02B 26/02*  (2006.01)

(52) U.S. Cl.
USPC ........................... 359/233; 359/230; 359/232

(58) Field of Classification Search
USPC ............... 359/230–233, 198.1–199.4, 359/200.6–200.8, 202.1, 221.2, 359/223.1–225.1, 226.2, 290–295, 838, 359/846, 871, 872, 904, 486.02; 250/204, 250/559.06, 559.29, 230; 347/255–260; 353/39, 98–99; 385/15–18, 22; 398/12, 398/19, 45
See application file for complete search history.

(56) References Cited

U.S. PATENT DOCUMENTS

| | | | |
|---|---|---|---|
| 5,959,763 A * | 9/1999 | Bozler et al. ................ | 359/290 |
| 7,365,897 B2 | 4/2008 | Hagood et al. | |
| 2008/0062500 A1* | 3/2008 | Hagood, IV ................. | 359/230 |
| 2009/0231669 A1 | 9/2009 | Shirai et al. | |

FOREIGN PATENT DOCUMENTS

| | | |
|---|---|---|
| CN | 101271227 | 9/2008 |
| CN | 101379545 | 3/2009 |
| JP | 02-032315 | 2/1990 |
| JP | 09-189869 | 7/1997 |
| JP | 2004-205973 | 7/2004 |
| JP | 2008-538009 | 10/2008 |
| KR | 1020020028570 | 4/2002 |
| KR | 100763397 | 9/2007 |
| KR | 1020080096090 | 10/2008 |
| WO | 2006/091738 | 8/2006 |
| WO | 2008-152397 | 12/2008 |

* cited by examiner

*Primary Examiner* — Stephone B. Allen
*Assistant Examiner* — Kimberly N Kakalec
(74) *Attorney, Agent, or Firm* — H.C. Park & Associates, PLC

(57) ABSTRACT

The display apparatus including a microelectromechanical (MEMS) shutter is disclosed. The MEMS shutter is shifted by the switching element in a horizontal direction corresponding to the light control area to turn on or turn off the light control area. A first slit transmits light generated from the light source to the MEMS shutter of a first substrate and a second slit of a second substrate corresponding to the first slit provides apertures by overlapping the first slit and the second slit. The apertures of the MEMS shutter are distributed on a two dimensional plane and form a geometrically symmetric pattern that are capable of enhancing light-use efficiency.

11 Claims, 10 Drawing Sheets

Fig. 9
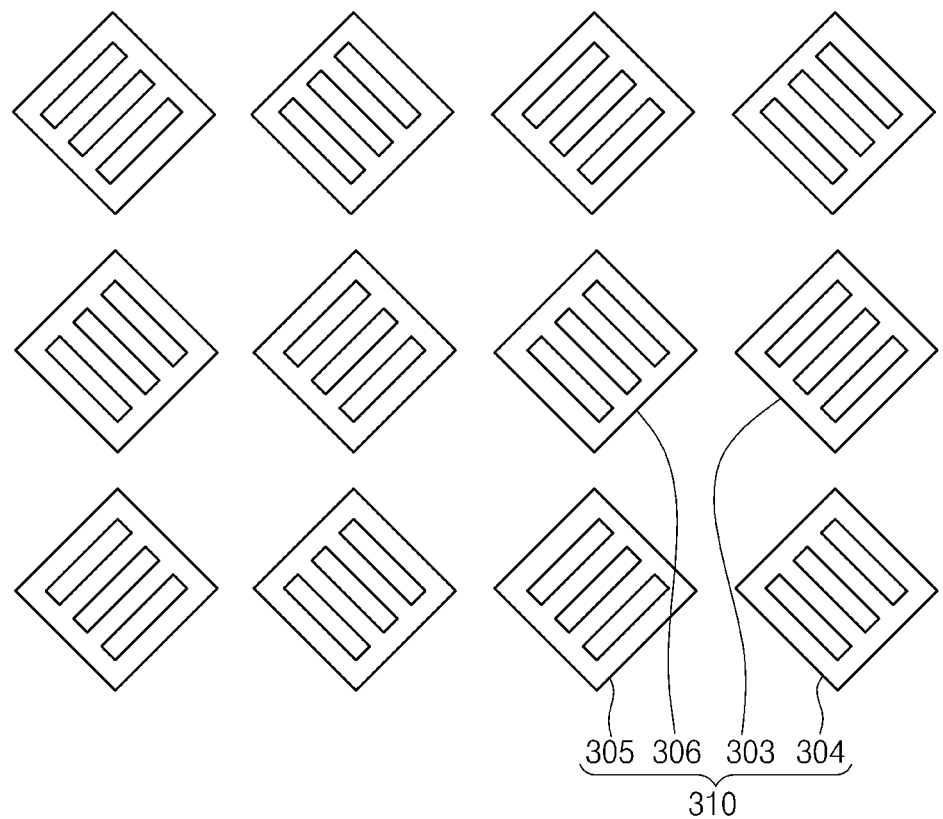
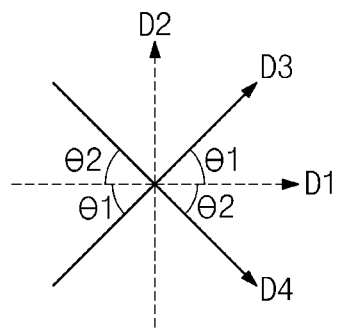

MEMS SHUTTER AND DISPLAY APPARATUS HAVING THE SAME

CROSS-REFERENCE TO RELATED APPLICATION

This application claims priority to and the benefit of Korean Patent Application No. 10-2010-0027452, filed on Mar. 26, 2010, which is herein incorporated by reference for all purposes as if fully set forth herein.

BACKGROUND OF THE INVENTION

1. Field of the Invention

Exemplary embodiments of the present invention relate to microelectromechanical (MEMS) shutter and a display apparatus including the MEMS shutter. More particularly, exemplary embodiments of the invention relate to a display apparatus including symmetric arrangement of the MEMS shutter having asymmetrical-shaped aperture.

2. Description of the Related Art

Generally, display devices provide users with conveniences of viewing and editing of contents of the display devices by using an input device. Manufacturers of display devises, for example, cathode ray tube ("CRT") devices, liquid crystal display ("LCD") devices, plasma display panel ("PDP") devices, and field emission display ("FED") devices are challenged to continually add greater and greater functional capabilities in the display devices.

For instance, beyond the already advanced display devices, researches for employing new types of display devices have been conducted as an accepted mode of an application for the display devices. For example, organic light-emitting diode ("OLED") displays have been accepted and recognized as next-generation devices of the display devices. Moreover, consumers expect more capability as well as the necessity and value for the flexible display devices, thereby interests in flexible display devices is increasing. In addition, advantages using a microelectromechanical system ("MEMS") of the display devices have spawned significant adoption by manufacturers taking benefits such as high light-use efficiency and high-speed switching characteristics.

A display device implementing the MEMS may be classified, for example, into a reflective-type display device and a transmissive-type display device. A MEMS shutter display device, which is a display device based on the MEMS realized by using the LCD process, has been recognized to enable high quality of images of the display device. The MEMS-based display device may include a MEMS shutter which moves in a horizontal direction and a slit substrate in which an aperture is formed in an area to control the MEMS shutter.

However, the goals of the rectangular-shaped aperture of the MEMS shutter to minimize a moving length in a particular direction are at odds with an asymmetrical rectangular shape which causes narrow viewing angle as a consequence.

SUMMARY OF THE INVENTION

Exemplary embodiments of the invention provide an MEMS shutter capable of providing an enhanced viewing angle thereof.

Exemplary embodiments of the invention provide a display apparatus having the MEMS shutter.

Additional features of the invention will be set forth in the description which follows, and in part will be apparent from the description, or may be learned by practice of the invention.

Exemplary embodiments of the invention provide a display apparatus. The apparatus includes a light source. The apparatus also includes a first substrate having a first slit to transmit incident light from the light source. The apparatus also includes a second substrate having a second slit positioned corresponding to the first slit. The apparatus includes a microelectromechanical (MEMS) shutter having the second slit an the MEMS shutter is configured to move forward and backward in a horizontal direction parallel to the first substrate and the second substrate. And apertures are formed by overlapping the second slit with the first slit. The apertures of the MEMS shutter are symmetrically distributed on a two dimensional plane with respect to the first substrate and the second substrate.

Exemplary embodiments of the invention provide a microelectromechanical (MEMS) shutter. The shutter includes a transmission layer having a first slit including plural slits through which light is transmitted. The shutter also includes a second slit including plural slits corresponding to the first slit. The shutter includes an electrode part having at least one electrode and provided at a portion of the shutter. The electrode part controls an aperture of is overlapped area between the first slit and the second slit according to a voltage level applied to the electrode to provide varying levels of gray scale.

Exemplary embodiments of the invention provide a display apparatus. The display apparatus includes a substrate to define plural pixel areas. The display apparatus includes plural microelectromechanical (MEMS) shutters disposed on the respective pixel areas. The MEMS shutters include a transmission layer having a first slit including plural slits through which a light is transmitted. The MEMS shutters include a shutter having a second slit including plural slits corresponding to the respective slits of the first slit. And at least one electrode is provided to control an aperture of an overlapped area between the first slit and the second slit by a voltage level to provide varying levels of gray scale.

Exemplary embodiments of the invention provide a method. The method includes providing a light source and a first substrate comprising a plural slits to transmit light from the light source and a second substrate comprising a plural slits corresponding to the slits of the first substrate. The first substrate and the second substrate are disposed in parallel each other. The slits of the second substrate are symmetrically disposed to form shutter arrays to shut and open portions of the slits of the first substrate to control micro-electro-mechanical apertures of the shutter arrays that are symmetrically disposed with respect to light travels via the apertures associated with the MEMS shutter arrays to achieve enhanced optical throughputs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 9 is a diagram of plural MEMS shutters arranged on the second substrate according to exemplary embodiments of the present invention.

DETAILED DESCRIPTION OF THE ILLUSTRATED EMBODIMENTS

Figure 1:
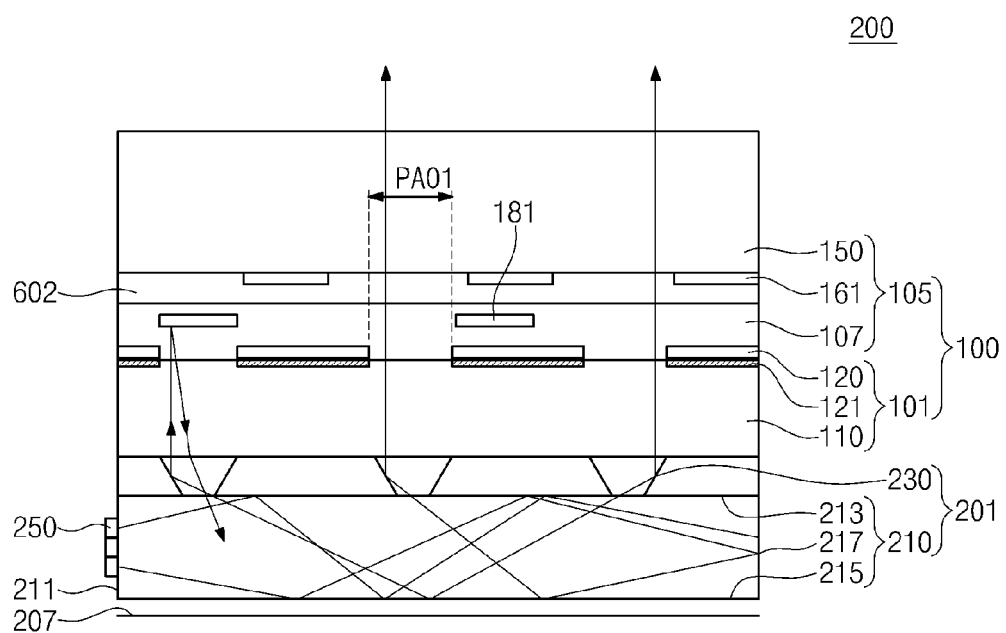
FIG. 1 is a cross-sectional view illustrating a display apparatus according to exemplary embodiments of the present invention.

Advantages and features of the present invention can be understood more readily by reference to the following detailed description of exemplary embodiments and the accompanying drawings. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art.

The invention is described more fully hereinafter with reference to the accompanying drawings, in which exemplary embodiments are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the sizes and relative sizes of layers and regions may be exaggerated for clarity.

It is understood that when an element or layer is referred to as being "on" "connected to" or "coupled to" another element or layer, it can be directly on or connected the other element or layer or intervening elements or layers may be present. In contrast, when an element is referred to as being "directly on" "directly connected to" or "directly coupled to" another element or layer, there are no intervening elements or layers present. Like numerals refer to like elements throughout. As used herein, the term "and/or" may include any and all combinations of one or more of the associated listed items.

It is understood that, although numerical terms such as first, second, and third, they may be used herein to describe various elements, components, regions, layers and/or sections, these elements, components, regions, layers and/or sections should not be limited by these numerical terms. These terms are merely used to specify a sequence order of an element, a component, a region, a layer and a section. Thus, a first element, a first component, a first region, a first layer or a first section discussed below may be interpreted a second element, a second component, a second region, a second layer or a second section without departing from the teachings of the invention.

Spatially relative terms, such as "below," "lower," "above," "upper" and the like, may be used herein for illustration of elements or spatial relationship with respect to one element or feature's relationship to another element(s) or feature(s) as illustrated in the figures. It is understood that the spatially relative terms may be intended to encompass different orientations of the device in use or operation in addition to the orientation depicted in the figures. For example, if the device in the figures is turned over, elements described as "below" or "lower" relative to other elements or features would then be oriented "above" or "upper" relative to the other elements or features. Thus, the exemplary term "below" may encompass both an orientation of above and below. The device may be otherwise oriented (rotated 90 degrees or at other orientations) and the spatially relative terms used herein may be interpreted accordingly.

It is also understood that terminology used herein is for the purpose of describing exemplary embodiments is not intended to be limiting of the invention. As used herein, the singular forms "a," "an" and "the" may include the plural forms as well unless the context clearly indicates otherwise. It is further understood that the terms "comprises" and/or "comprising," when used in this specification, specify the presence of stated features, integers, is steps, operations, elements, and/or components, but may not be interpreted to preclude an addition of one or more other features, integers, steps, operations, elements, components, and/or groups thereof.

FIG. 1 is a cross-sectional view illustrating a display apparatus according to exemplary embodiments of the present invention.

Referring to FIG. 1, a display device 200 of the illustrated embodiment includes a display panel 100, a light guide unit 201 and a light source 250. The display panel 100 may include a display element using a microelectromechanical system ("MEMS"). The display panel 100 includes a first substrate 101 and a second substrate 105.

The light guide unit 201 guides a light output from the light source 250 to provide the light to the display panel 100. The light source 250 may include light emitting diodes or cold cathode fluorescent lamps. According to exemplary embodiments, the light source 250 may include light emitting diodes. The light source 250 may include one or a plurality of white, red, green or blue light emitting diodes.

The light guide unit 201 includes a light guide plate 210 and a light emitting protrusion 230.

For example, the light guide plate 210 may be disposed below the first substrate 101. The light guide plate 210 having a plate shape includes a light incident plane 211 receiving the light outputted from the light source 250, an upper plane 213 and a lower plane 215 facing each other and connected to the light incident plane 211, and an opposite plane 217 facing the light incident plane 211.

The light source 250 is disposed on the light incident plane 211 of the light guide plate 210. The light guide plate 210 diffuses the light output from the light source 250 to provide is a uniform light to the display panel 100. As shown in FIG. 1, the incident light on the light incident plane 211 output from the light emitting diodes may totally be reflected at the upper plane 213, the lower plane 215, and the opposite plane 217 of the light guide plate 210. To totally reflect the light, the upper plane 213, the lower plane 215, and the opposite plane 217 of the light guide plate 210 may not include a pattern like bumps and shapes of the planes preferably be flat.

The light guide plate 210 includes polymer resin having high light transmittance, high light diffusion ratio, high thermal resistance, high chemical resistance, and high mechanical strength. For example, the polymer resin may be polymethylmethacrylate, polyamide, polyimide, polypropylene, and polyurethane.

The display apparatus 200 may further include a reflective sheet 207. For example, the reflective sheet 207 may be disposed below the lower plane 215 of the light guide plate 210 and reflects a portion of the light output from the lower plane 215 of the light guide plate 210.

Figure 2:
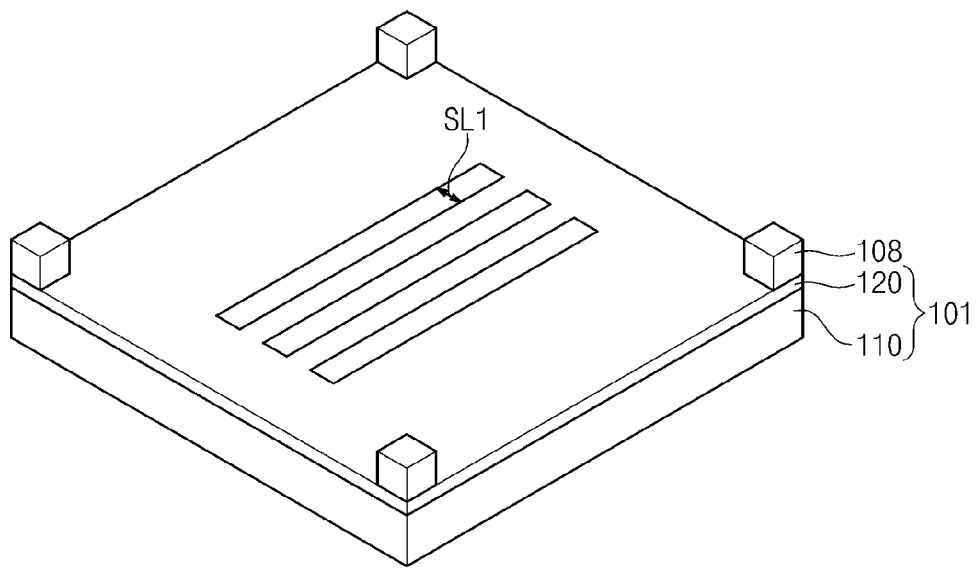
FIG. 2 is a perspective view illustrating a portion of the first substrate of FIG. 1.

Referring to FIG. 1 and FIG. 2, the first substrate 101 includes a first insulating substrate 110 and a light-blocking layer 120. The first insulating substrate 110 may include a glass material or a plastic material. A plurality of unit areas, for example, pixel areas may be defined on an upper surface of the first insulating substrate 110.

The light-blocking layer 120 is disposed on an upper surface of the first insulating substrate 110. The light-blocking layer 120 blocks or absorbs a light incident through the second substrate 105 from an exterior so that reduction of a contrast ratio of the display panel 100 may effectively be prevented that is occurred due to unnecessarily reflected light. The light-blocking layer 120 may include a light-absorbing layer, for example, a black chrome layer. For example, is the light-blocking layer 120 may be disposed in a single layer.

A plurality of first slit SL1 is disposed extending through the light-blocking layer 120 in a direction perpendicular to the upper surface of the first insulating substrate 110. The upper surface of the first insulating substrate 110 is exposed by the first slits SL1. The first slits SL1 are an enclosed opening penetrating the light-blocking layer 120 where the light-blocking layer 120 defines the enclosed first slits SL1. The first slits SL1 are disposed in the unit areas. In some examples, the first slits SL1 are disposed in a longitudinal direction and extending in a straight line shape. Three first slits SL1 are disposed in a unit area in parallel. Light, which is emitted from the light source 250 via the light guide unit 201, is provided to the second substrate 105 through the first slits SL1.

The first substrate 101 may further include an insulation layer (not shown). The insulation layer may insulate the light-blocking layer 120 by covering (e.g., overlapping) the light-blocking layer 120, and may physically and chemically protect the light-blocking layer 120.

In some examples, a light-reflecting layer 121 may be disposed between an upper surface of the first insulating substrate 110 and the light-blocking layer 120. In a conventional display device, the light-reflecting layer 121 may be disposed in a plurality of layers such as an aluminum layer, a dioxide silica layer, and a dioxide titanium layer. The light-reflecting layer 121 recycles the remaining light that is not incident to the first slits SL1 by reflecting the remaining light so that light-use efficiency may be enhanced. However, according to technology and structural features of the illustrated embodiments, light-use efficiency may be enhanced without the light-reflecting layer. A detailed explanation of the above subject is described below.

Referring to FIG. 2, the first substrate 101 may further comprise a spacer 108. The spacer 108 is provided between the first substrate 101 and the second substrate 105 to hold the distance between the first substrate 101 and the second substrate 105. In some examples, the spacer 108 and the first insulating substrate 110 may be formed as an integral unit.

The light emitting protrusion 230 may be provided in a plural number. The light emitting protrusion 230 is provided between the light guide plate 210 and the first insulating layer 110 and disposed between two adjacent unit areas to guide the light output from the light guide plate 210 to the unit areas.

Figure 3:
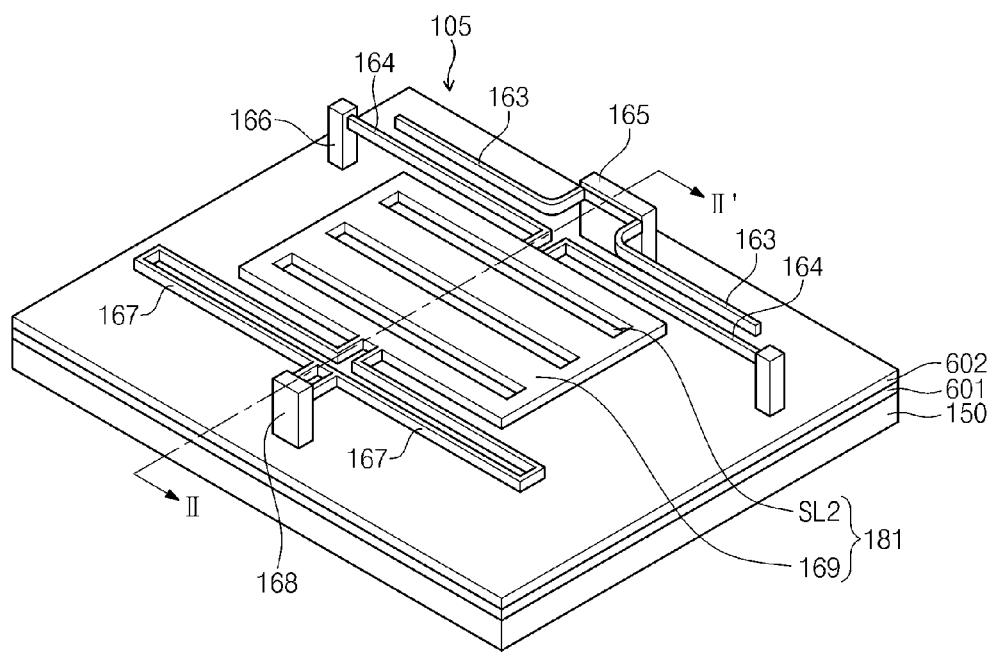
FIG. 3 is a perspective view illustrating a portion of the second substrate of FIG. 1.

FIG. 3 is a perspective view illustrating a portion of the second substrate 105 of FIG. 1.

Referring to FIG. 1 and FIG. 3, the second substrate 105 may include the second insulating substrate 150, a switching element 161, a second insulating interlayer 602 and a MEMS shutter 181.

The second insulating substrate 150 is disposed to face the upper surface of the first insulating substrate 110. The second insulating substrate 150 may include glass material and/or plastic material. A plurality of light control area PA01 corresponding to the unit areas, respectively, may be defined on a lower surface of the second insulating substrate 150. The second insulating substrate 150 may include a plurality of circuit wirings, such as gate lines 121 and data lines 171 thereon.

In FIG. 2 and FIG. 3, one MEMS shutter includes three slits, but the number of slits included in one MEMS shutter can be changed according to exemplary embodiments.

Figure 4:
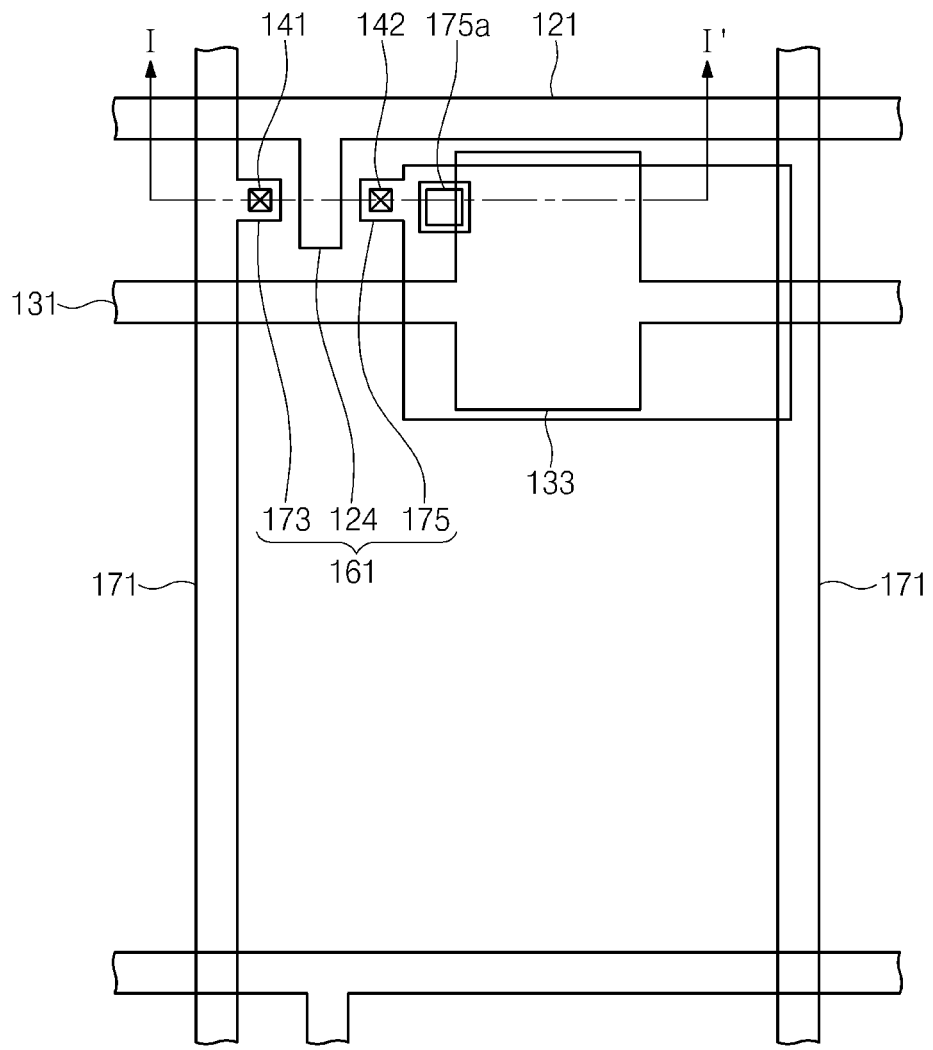
FIG. 4 is a plan view illustrating an exemplary active matrix circuit formed on the second substrate.

FIG. 4 is a plan view illustrating an exemplary active matrix circuit formed on the second substrate.

The gate lines 121 may be disposed on a peripheral area between adjacent light is control areas PA01 to be longitudinally extended along a first direction. The data line 171 may be insulated from the gate line 121, and may be disposed to be longitudinally extended along a second direction crossing the gate line 121. The second substrate 105 may include active matrix circuit such as gate line 121 and data line 171. FIG. 4 shows a diagram illustrating an exemplary active matrix circuit.

In operating the display apparatus 200, positive charges or negative charges may be preliminarily applied to the MEMS shutter 181. When a scan signal is applied to the gate electrode 124 through the gate line 121, and a data signal is applied to the source electrode 173 through the data line 171, the data signal is applied to the electrode portions 163, 164, 165, and 166. Thus, due to the electrostatic force with the electrode portions 163, 164, 165, and 166, the MEMS shutter 181 shifts in a left direction and a right direction, that is, in a horizontal direction in parallel with the second substrate 105. When the data signal is a turn-on signal, the MEMS shutter 181 is moved in the horizontal direction to correspond and align the first slits SL1 of the light blocking layer 120 and the second slits SL2 of the MEMS shutter 181 with each other. When the data signal is a turn-off signal, the MEMS shutter 181 is shifted in a horizontal direction to close (e.g., overlap) the first slits SL1 of the light blocking layer 120 such that the second slits SL2 is not aligned with the first slits SL1.

A signal flowed to the drain electrode 175 through a contact hole 142 is charge on the storage electrode 133 connected to the storage line 131 extending in parallel to the gate line 121.

Referring to FIG. 1, the display panel 100 may further include an insulating fluid 107. In some examples, the insulating fluid 107, such as oil, is disposed between the first substrate 101 and the second substrate 105.

As shown in FIG. 3, the second substrate 105 may include the MEMS shutter 181, the electrode portions 163, 164, 165, and 166 shifting the MEMS shutter 181 in a horizontal direction using electrical attraction or repulsion acted on the MEMS shutter 181, and restoration portions 167 and 168 moving the MEMS shutter 181 to the original position by elastic force. The MEMS shutter 181 is located on the pixel areas, and the electrode portions 163, 164, 165, and 166 and the restoration portions 167 and 168 are located on a region of the first substrate 101 corresponding to the gate line 121 or the data line 171 of the second substrate 105.

The MEMS shutter 181 is made of a plate shape and includes a plurality second slits SL2 and the light-blocking layer 120. The second slits SL2 may have substantially the same shape and size as the first slits SL1. In some examples, an area of one of the first slits SL1 may be 95~98 percent of an area of one of the second slits SL2 to fully cover the first slits SL1.

The electrode portions 163, 164, 165, and 166 include a first supporter 165 formed on the second insulating substrate 150, the first flexible beam 163 connected to the first supporter 165, the second flexible beam 164 interacting with the first flexible beam 163 by a electrostatic force and the second supporter 166 fixing the second flexible beam 164 on the second insulating substrate 150. The second flexible beam 164 may be located at a predetermined distance apart from the first flexible beam 163 to provide an electrostatic force on each other.

The restoration portions 167, 168 include a third flexible beam 167 providing elastic force to the MEMS shutter 181 and a third supporter 168 fixing the third flexible beam 167 to the second insulating substrate 150.

The first supporter 165 is connected to a protrusion electrode 175a. A data signal applied to the protrusion electrode 175a may be transferred to the first flexible beam 163 through is the first supporter 165. The MEMS shutter 181 may be floated by the second supporter 166 from the surface of the second insulating interlayer 602 by a distance of d2 to smoothly move in a horizontal direction.

An end of the first flexible beam 163 is fixed to the first supporter 165, and the other end is extended to be bent from the first supporter 165 as an arrow.

An end of the second flexible beam 164 is fixed to the second supporter 166, and the other end is connected to the MEMS shutter 181 to be bent by interacting with the first flexible beam 165.

The third flexible beam 167 may be formed as a cross shape to have an elastic force. An end of the third flexible beam 167 is connected to the MEMS shutter 181 and the other end is fixed to the third supporter 168. Since the third flexible beam 167 is an elastic energy container like a spring, it can be formed diverse shape except the cross shape shown in the exemplary embodiments.

The position of the second slits SL2 can be controlled by a horizontal movement of the MEMS shutter 181. Light transmission is dependent on the position of second slits SL2 of the MEMS shutter 181 against the first slits SL1 of the first insulating substrate 110. In some examples, the MEMS display may not be dependent on light path like a liquid crystal display. Light loss between the first insulating substrate 110 and the second insulating substrate 150 and influence by diffraction or interference between adjacent pixels may be negligible. Therefore, the efficiency of light usage and power consumption can be improved.

Figure 5:
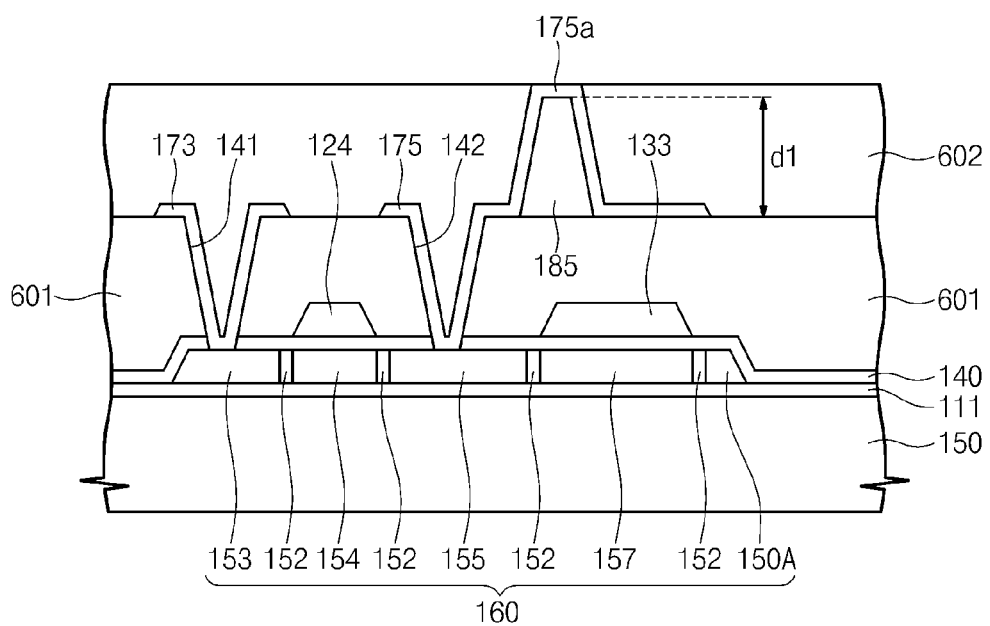
FIG. 5 is a cross-sectional view of the first substrate taken along the line I-I' of FIG. 4.

FIG. 5 is a cross-sectional view of the first substrate taken along the line I-I' of FIG. 4 according to exemplary embodiments of the present invention.

Referring to FIG. 5, a blocking layer 111 comprising silicon dioxide ($SiO_2$) or is silicon nitride (SiNx) is formed on the second substrate 105. The blocking layer 111 improves adhesion between the second insulating substrate 150 and a multi crystalline silicon layer 160, and can prevent a conductive impurities existing inside the second insulating substrate 150 from being diffused into the multi crystalline silicon layer 160.

The multi crystalline silicon layer 160 comprising a source region 153, a drain region 155, a channel region 154, and a lightly doped extrinsic region 152 is formed on the blocking layer 111.

The lightly doped extrinsic region 152 prevents current leakage or punch-through from occurring. The source region 153 and the drain region 155 may be doped with N-type or P-type conductive impurities with a high concentration and the channel region 154 may not be doped with impurities. A gate insulating layer 140 may be formed on the multi crystalline silicon layer 160.

Referring to FIG. 4 and FIG. 5, the gate line 121 extending in one direction is formed on the gate insulating layer 140. A portion of the gate line 121 is extended to overlap the channel region 154 of the multi crystalline silicon layer 160. The overlapped portion of the gate line 121 is used as a gate electrode 124 of a thin film transistor. One end of the gate line 121 may have a wider area than the width of gate line 121 for a connection with an external circuit.

A storage line 131 for increasing storage capacitance of a pixel is formed parallel to the gate line 121 and comprises a same material as the gate line 121. A portion of the storage line 131 overlapping the multi crystalline silicon layer 160 is a storage electrode 133. The multi crystalline silicon layer 160 overlapping the storage electrode 133 is a storage electrode region 157.

The gate line 121 and the storage line 131 may include a conductive layer having is low resistance, such as aluminum (Al), an aluminum-based metal, aluminum alloy, silver (Ag), a silver-based metal, or silver alloys. The gate line 121 and the storage line 131 may have a multi-layered structure including the conductive layer and another conductive layer having good electrical and physical contact characteristic with a different material such as ITO or IZO. The another conductive layer of the multi-layered structure can be, for example, chromium (Cr), titanium (Ti), tantalum (Ta), molybdenum (Mo), or alloys thereof. When the multi-layered structure has a lower layer and an upper layer, an example of a combination of the lower layer and the upper layer in the multi-layered structure may be chromium/aluminum-neodymium (Nd) alloy.

A first insulating interlayer 601 is formed on the gate insulating layer 140 where the gate line 121 and storage electrode line 131 are formed. The first insulating interlayer 601 may comprise double layers of $SiO_2$/SiN, and in this example, the reliability of the thin film transistor is improved as compared to when the first insulating interlayer 601 comprises a single layer of $SiO_2$.

The first insulating interlayer 601 includes first contact holes 141 and second contact holes 142 respectively exposing the source region 153 and the drain region 155.

A protrusion 185 having a height d1 is formed on the first insulating interlayer 601. A data line 171 intersecting the gate line 121 to define the pixel areas is formed on the first insulating interlayer 601. A portion or a branch of the data line 171 is connected to the source region 153 through the first contact hole 141 and used as the source electrode 173 of the thin film transistor. One end of the data line 171 may be wider than the width of the data line 171 for a connection with an external circuit.

A drain electrode 175 connected to the drain region 155 through the second is contact hole 142 is formed on the same layer as the data line 171, and is separated from the source electrode 173 by a predetermined distance. The drain electrode 175 is extended on the protrusion 185, thereby forming the protrusion electrode 175a. The protrusion electrode 175a may be formed by a photolithography process according to exemplary embodiments of the present invention.

The data line 171 and the drain electrode 175 may comprise a conductive layer having good electrical and physical contact characteristics with ITO or IZO, such as a molybdenum-based metal or a molybdenum alloy. In some examples, the conductive layer may comprise a molybdenum-tungsten (MoW) alloy. The data line 171 and the drain electrode 175 may include a conductive layer having low resistance, such as an aluminum-based metal, aluminum alloys, a silver-based metal or silver alloys. The data line 171 and the drain electrode 175 may have a multilayered structure including the conductive layer having low resistance and a different conductive layer comprising, for example, chromium (Cr), titanium (Ti), tantalum (Ta), molybdenum (Mo), or alloys thereof. In some examples, the different conductive layer can be a molybdenum-tungsten (MoW) alloy.

According to exemplary embodiments of the present invention, a thin film transistor having the multi crystalline silicon layer 160 is shown, but the structure having the protrusion electrode 175a may also be employed using a thin film transistor having amorphous silicon layer (not shown).

Figure 6:
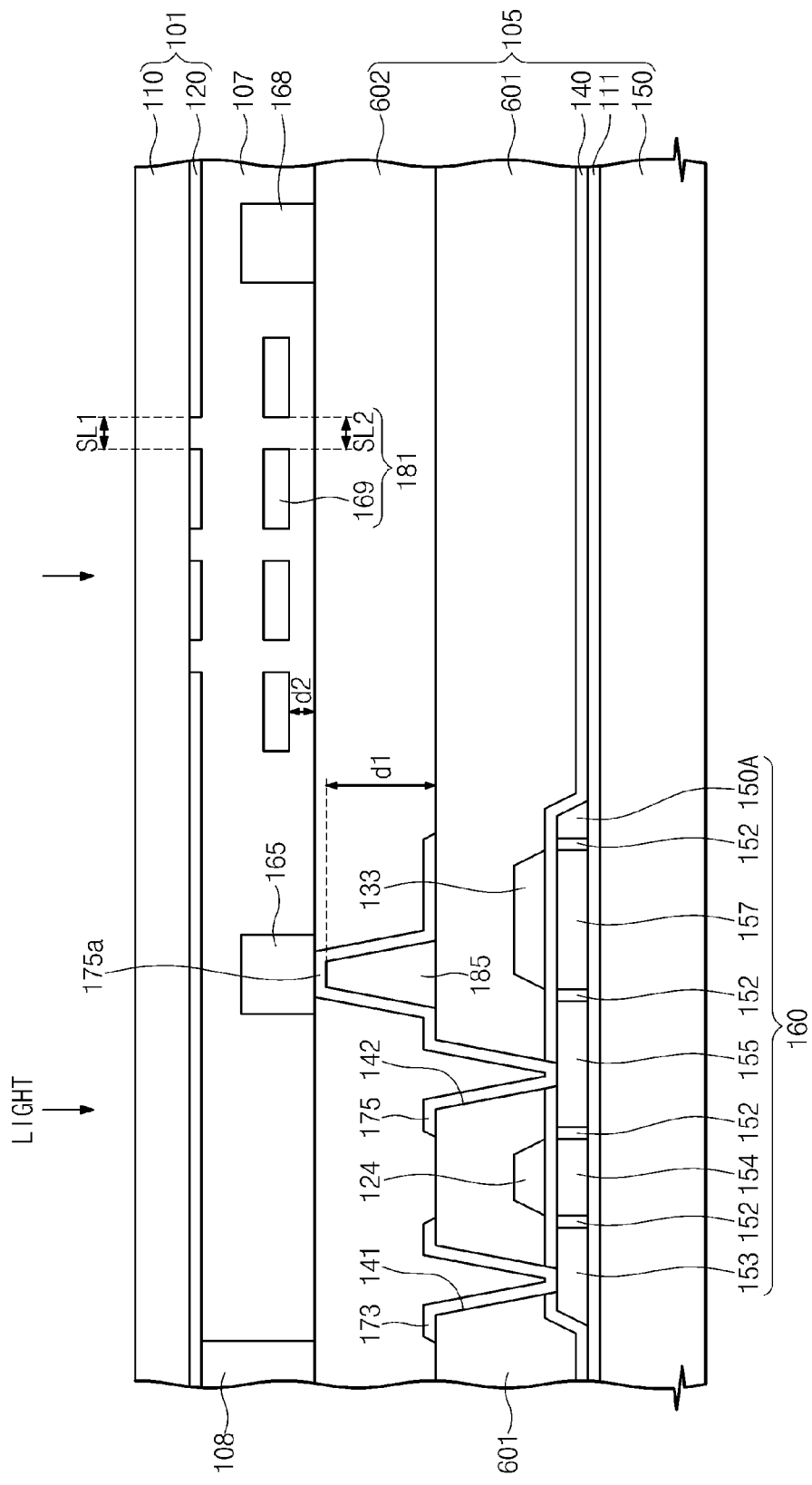
FIG. 6 is a cross-sectional view of the display panel taken along the line II-II' of FIG. 3.

FIG. 6 is cross-sectional view of the display panel 100 taken along the line II-II' of FIG. 3. The first substrate 101 is combined with the second substrate 105 through the spacer 108 interposing the insulating fluid 107 therebetween. The spacer 108 may be formed with about 10 um thickness in order not to disturb the horizontal movement of the MEMS shutter 181.

On the other hand, referring to FIG. 1, FIG. 4, and FIG. 6, the gate lines 121 on the second insulating layer 150 are extended in a direction at a surrounding portion between two adjacent light control areas PA01 of FIG. 1. The gate lines 121 intersect the data lines 171 insulated by the gate insulating layer 140. The gate lines 121 and the data lines 171 may be located on a surrounding portion of the light control areas (PA01) on the second insulating substrate 150.

In some examples, the second insulating substrate 150 may further include a driving circuit (not shown). The driving circuit may be mounted on edges of the second insulating substrate 150 as a chip or an integrated circuit on the second insulating substrate 150. The driving circuit may be also mounted on an external printed circuit board and may be connected to the second insulating substrate 150.

The switching device 161 may be formed on the surrounding portion nearby the gate line 121 and the data line 171. The switching device 161 includes a gate electrode 124 connected to the gate line 121, a source electrode 173 connected to the data line 171, and a drain electrode 175 facing the source electrode 173.

The first insulating interlayer 601 covers the switching device 161, the gate lines 121 and the data lines 171 and has a contact hole 142 exposing the drain electrode 175.

The electrode portions 163, 164, 165, and 166 and the restoration portions 167 and 168 are disposed on the first insulating interlayer 601 to face each other corresponding to the light control areas PA01. The first supporter 165 and the first flexible beam 163 shown in FIG. 3 may be connected to the switching device 161 through the protrusion electrode 175a formed on the protrusion 185 and contacting the drain electrode 175 via the contact hole 142.

Figure 7:
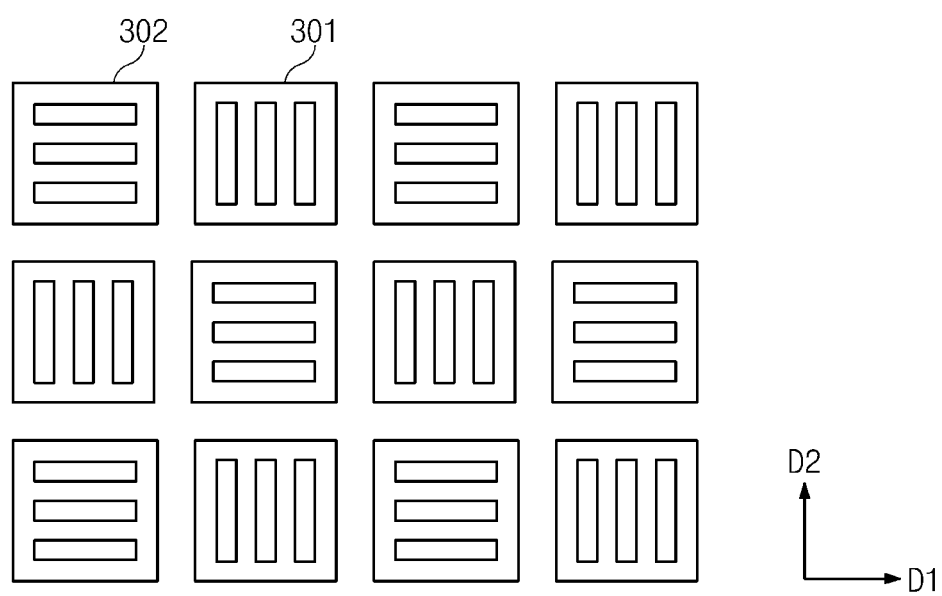
FIG. 7 is a diagram of plural MEMS shutters arranged on the second substrate according to exemplary embodiments of the present invention.

FIG. 7 is a schematic plan view showing plural MEMS shutters arranged on the is second substrate according to exemplary embodiments of the present invention.

A first-type MEMS shutter 301 includes plural slits extended to a first direction D1. A second-type MEMS shutter 302 located nearby the first-type MEMS shutter 301 may include plural slits extended to a second direction D2 perpendicular to the first direction D1. The second-type MEMS shutter 302 may be arranged adjacent to the first-type MEMS shutter 301 at positions adjacent in four directions, i.e. the first direction D1, the second direction D2, an opposite direction to the first direction D1, and an opposite direction to the second direction D2.

Figure 8A:
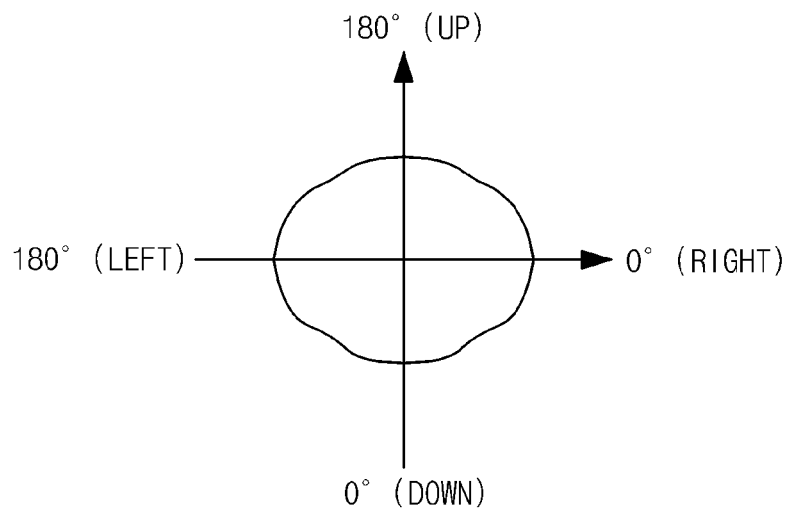
FIG. 8A and FIG. 8B are diagrams of graphs showing simulation results according to MEMS shutter arrangement of FIG. 7.
Figure 8B:
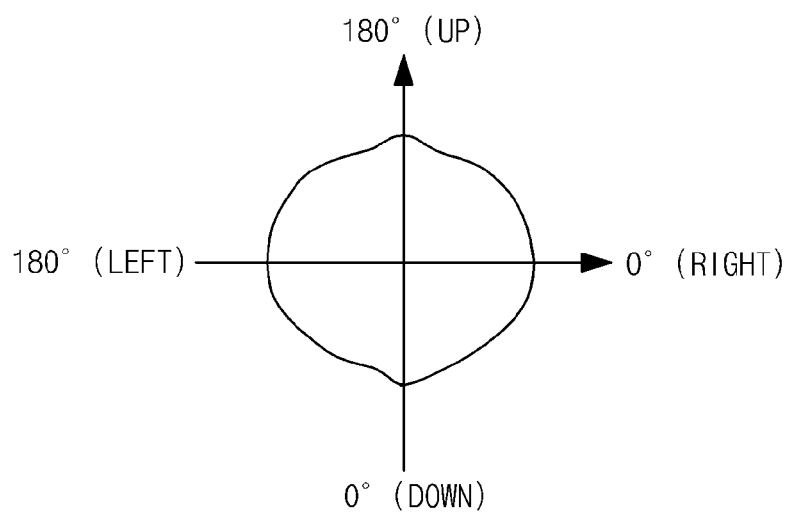

FIG. 8A and FIG. 8B are diagrams of graphs showing the effect of the MEMS shutter arrangement shown in FIG. 7 according to exemplary embodiments of the present invention.

FIG. 8A and FIG. 8B are simulation results of light intensity transmitted in four directions, i.e. up, down, right and left, when using four shutters. FIG. 8A is a diagram of a graph showing the simulation result of light intensity when using four first-type MEMS shutters and FIG. 8B is a diagram of a graph showing the simulation result of light intensity when using two first-type MEMS shutters and two second-type MEMS shutters. Lines connecting angular positions having a same light intensity are shown in FIG. 8A and FIG. 8B, respectively. It is understood that viewing angle along the second direction D2 and the opposite direction to the second direction D2 configured in FIG. 8B is enhanced rather than configurations in FIG. 8A.

FIG. 9 is a diagram of plural MEMS shutters arranged on the second substrate according to exemplary embodiments of the present invention.

A third-type MEMS shutter 303 includes plural slits extended to a third direction D3 between the first and second directions D1 and D2. A fourth-type MEMS shutter 304 located nearby the third-type MEMS shutter 303 may include plural slits extended to a fourth direction is D4 substantially perpendicular to the third direction D3.

The third-type MEMS shutter 303 extended to the third direction D3 may form symmetric MEMS shutter group 310 with additional three MEMS shutters extended to the fourth direction D4, and 180° reverse direction of the third and fourth directions D3 and D4, respectively. The fifth MEMS shutter 305 and the sixth MEMS shutter 306 include plural slits extended to the 180° reverse directions of the third and fourth directions D3 and D4, respectively. The symmetric MEMS shutter group 310 may include the third to sixth MEMS shutters 303, 304, 305 and 306. The symmetric MEMS shutter group 310 may be arranged on the overall first substrate 101. An angle, θ1, between the first direction D1 and the third direction D3 may be substantially 45°, but may vary from 0° to 90° by way of configurations. An angle, θ2, between the first direction D1 and the fourth direction D4 may be the same angle as θ1 or may not be the same angle as θ1 according to exemplary embodiments of the present invention.

Figure 10:
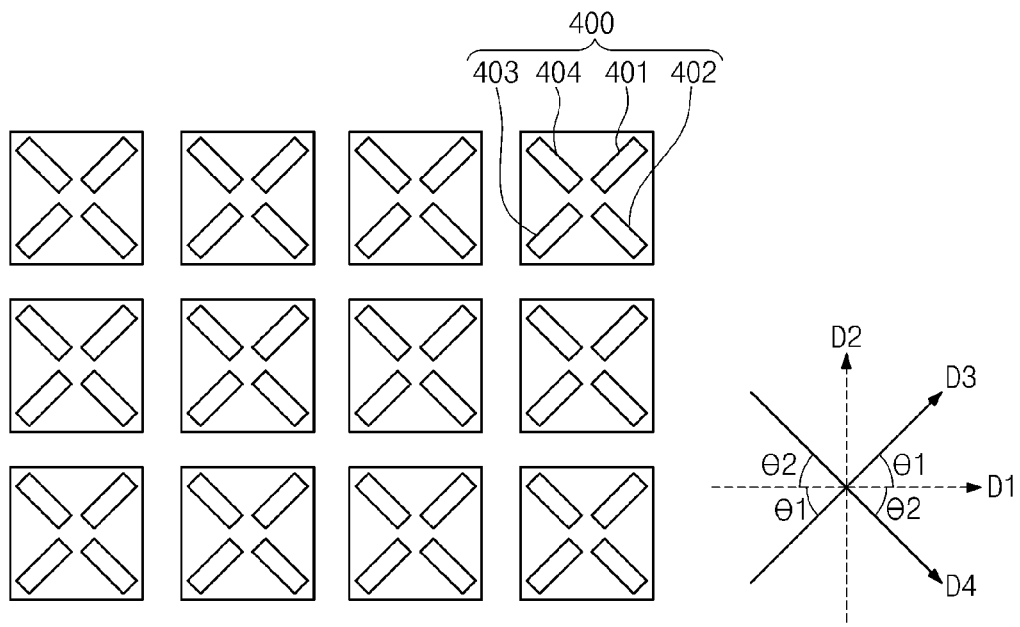
FIG. 10 is a diagram of plural MEMS shutters arranged on the second substrate according to exemplary embodiments of the present invention.

FIG. 10 is a schematic plan view of plural MEMS shutters arranged on the second substrate according to exemplary embodiments of the present invention.

FIG. 10 shows a seventh-type MEMS shutter 400. The seventh-type MEMS shutter 400 includes a first linear slit 401 extended in the third direction D3, a second linear slit 402 extended in the fourth direction, and a third linear slit 403 and a fourth linear slit 404 extended in the 180° reverse direction of the third and fourth directions D3 and D4, respectively. An angle, θ1, between the first direction D1 and the third direction D3 may be substantially 45°, but may vary from 0° to 90° by way of configurations. An angle, θ2, between the first direction D1 and the fourth direction D4 may be a same angle as θ1 or may not be the same angle as θ1 according to exemplary embodiments of the present invention. If the MEMS shutter 181 shown is in FIG. 3 is replaced by a seventh-type MEMS shutter 400, similar light intensity as shown in FIG. 9 can also be obtained in FIG. 10.

In FIG. 10, a distance between two adjacent slits in the first direction D1 or the second direction D2 may vary according to exemplary embodiments of the present invention.

Figure 11:
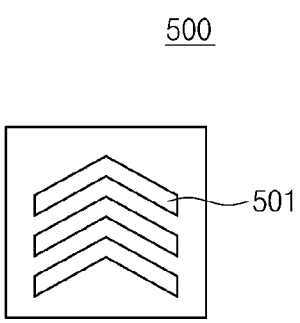
FIG. 11 is a diagram of a MEMS shutter according to exemplary embodiments of is the present invention.

FIG. 11 is a diagram of a MEMS shutter according to exemplary embodiments of the present invention.

A eighth-type MEMS shutter 500 may include plural V-shaped or reverse V-shaped slits bent towards two different directions. Although not shown in FIG. 11, the eighth-type MEMS shutter 500 may include plural U-shaped slits, reverse U-shaped slits, W-shaped slits, or reverse W-shaped slits. The MEMS shutters 301-306 and 400 shown in FIG. 7, FIG. 9 and FIG. 10 may be replaced by the eighth-type MEMS shutter 500 shown in FIG. 11.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:
   a light source;
   a first substrate comprising first slits configured to transmit incident light from the light source;
   a second substrate comprising a microelectromechanical (MEMS) shutter comprising second slits, the MEMS shutter configured to move forward and backward in a horizontal direction parallel to the first substrate and the second substrate,
   wherein apertures are formed by overlapping the second slits with the first slits,
   and wherein apertures of a first pixel area are aligned in a first direction, and apertures of a second pixel area adjacent to the first pixel area are aligned in a second direction different from the first direction.

2. The display apparatus of claim 1, wherein the second substrate further comprises a plurality of switching devices, gate lines, and data lines.

3. The display apparatus of claim 2, wherein the MEMS shutter is switched by an electrostatic force between a first electrode and a second electrode which is oppositely faced to the first electrode, the first electrode and the second electrode being connected to the switching device.

4. The display apparatus of claim 1, wherein the light source comprises a point light source, and the MEMS shutter controls transmittance of light incident from the point light source per unit of time.

5. The display apparatus of claim 4, wherein the point light source comprises a red color light emitting diode, a green color light emitting diode, and a blue color light emitting diode.

6. The display apparatus of claim 4, wherein the point light source comprises a white color light emitting diode.

7. The display apparatus of claim 1, further comprising:
   a light guide plate positioned between the first substrate and the light source to guide light output from the light source toward the MEMS shutter.

8. The display apparatus of claim 1, wherein slits of a first MEMS shutter and slits of a second MEMS shutter diagonally adjacent to the first MEMS shutter extend in a third direction, and slits of a third MEMS shutter and slits of a fourth MEMS shutter diagonally adjacent to the third MEMS shutter extend in a fourth direction perpendicular to the third direction.

9. The display apparatus of claim 1, wherein the MEMS shutter comprises slits respectively extending in a third direction, a fourth direction, a 180° opposite direction to the third direction, and a 180° opposite direction to the fourth direction.

10. The display apparatus of claim 1, wherein the MEMS shutter comprises a slit extending in a third direction and a fourth direction different from the third direction.

11. The display apparatus of claim 1, wherein the first slits are defined by a light blocking layer of the first substrate.

\* \* \* \* \*